Feb. 5, 1957 W. C. WELDON, SR 2,780,472
MECHANIC'S CREEPER
Filed Oct. 23, 1953
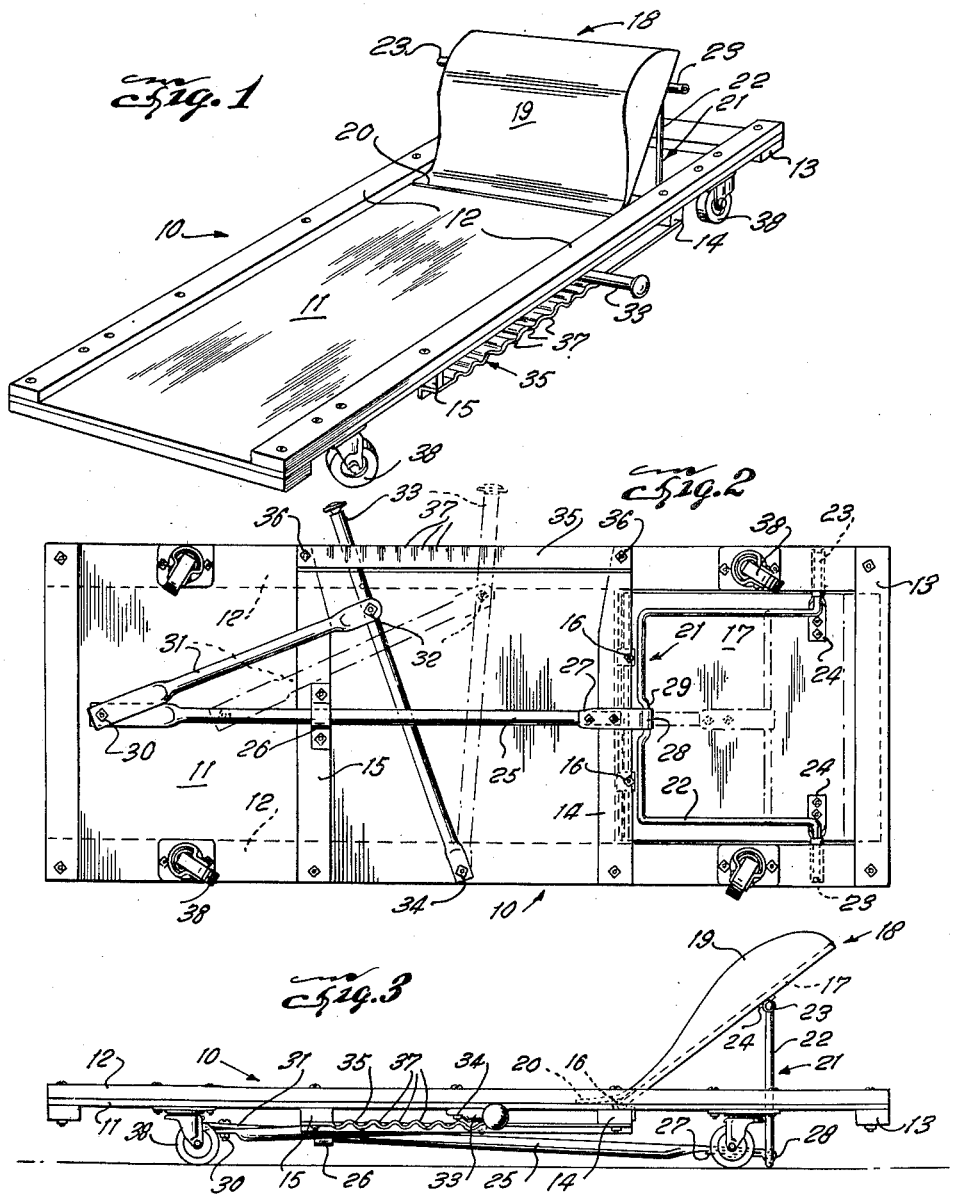
INVENTOR
William C. Weldon, Sr.
ATTORNEY United States Patent Office 2,780,472
Patented Feb. 5, 1957

2,780,472

MECHANIC'S CREEPER

William C. Weldon, Sr., Dallas, Tex.

Application October 23, 1953, Serial No. 387,864

1 Claim. (Cl. 280—32.6)

This invention relates to equipment used by automobile mechanics and more particularly to a mechanic's creeper.

Creepers of better known design consist merely of a platform supported on casters and provided at one end with a headrest which is usually stationary with the platform, others having headrests which are movable in one way or another. For the convenience of a mechanic working in close quarters under a vehicle, it is desirable that he have a head and shoulder support hinged in such manner to the creeper platform that it can be quickly adjusted by the mechanic, even in a confined space, to an angular position more comfortable and convenient for accomplishing certain work under the vehicle. For more effective results, the creeper should be provided with a braking means, preferably actuated by the same means employed for adjusting the headrest, to keep the creeper stationary even under stress of manual forces exerted thereon by the mechanic while performing his work.

It is the principal object of the invention to meet the foregoing requirements through the medium of a simple and comparatively inexpensive yet durable mechanism arranged on the underside of the creeper and actuated by a lever accessible at one side of the creeper to adjust the headrest to the desired angular position in relation to the creeper bed or platform.

Another object of the invention is to provide a mechanic's creeper equipped with an adjustable headrest whose lever actuated support functions also as a brake only when downward pressure is exerted on the headrest, thus enabling the mechanic to move the creeper freely except when his work imposes such downward thrust which is effective to urge the headrest support against the floor and thereby function as a brake.

Other objects will appear as the description proceeds when considered with the annexed drawing, wherein:

Figure 1 is a top perspective view of a mechanic's creeper constructed according to the invention.

Figure 2 is a bottom plan view, and

Figure 3 is a side elevational view.

Continuing with a more detailed description of the drawing, reference numeral 10 denotes generally the creeper whose construction includes a bed or platform 11, to the edges of which are secured side rails 12 on the top surface of the platform. It will be observed that the platform 11 terminates short of the forward ends, of the side rails 12, leaving an open space defined by the side rails, a transverse batten 13, extending between the side rails 12 at their forward ends and a batten 14 spaced rearwardly therefrom and secured at its ends to the side rails 12 across the forward end of the platform 11. Another similar batten 15 is secured in like manner to the rails 12 rearwardly of the batten 14.

Hinged at 16, to the forward end of the platform 11 is a board 17 whose dimensions permit it to lie between the side rails 12 in lowered position and rest upon the end batten 13. This board constitutes the headrest 18 and has attached thereto a cushion 19 whose cover extends downwardly over the hinges 16 at 20 to conceal the same.

An adjustable support for the headrest 18 is provided in the form of a substantially U-shaped member 21 whose legs 22 have their ends 23 turned outwardly at right angles to the legs. The outwardly turned ends 23 are journaled in bearings 24, secured to the underside of the board 17 adjacent each side thereof, thus permitting the member 21 to be moved in a plane perpendicular to the board 17.

To actuate the headrest supporting member 21, a rod 25 is mounted for longitudinal sliding displacement under the platform 11 by means of a bracket 26, secured to the batten 15. The forward end of the rod 25 carries a bracket 27 having a looped end 28 embracing an offset portion 29 formed in the member 21 midway between the legs 22 thereof. To the opposite or rear end of the rod 25 is pivoted at 30, one end of a link 31. The opposite end of the link 31 is pivotally connected by a pin 32 to an operating lever 33 at a point spaced from its free end which extends to a point of accessibility from under one side of the platform 11. The opposite end of the lever 33 is pivoted at 34 to a side rail 12. The lever 33 extends under the rod 25 and emerges between the platform 11 and a strap 35 of steel which underlies the side rail 12 in parallelism therewith opposite the pivotal point 34 of the lever 33. The steel strap 35 is affixed as by bolts 36 to the ends of battens 14 and 15 and a portion of the strap has a series of transverse corrugations or recesses 37 therein into which the lever 33 may be selectively moved to resist displacement thereof from adjusted positions.

To raise the headrest 18, the lever 33 is pulled forwardly toward the dotted line position shown in Figure 2 by the mechanic reclining on the platform 11. The link 31 is brought under tension to exert a force moving the rod 25 longitudinally toward the forward end of the creeper, thus forcing the lower portion of the supporting member 21 in a forwardly direction, causing the headrest 18 to move to an inclined position in relation to the creeper. The headrest may be held in any position to which it has been adjusted by means of the recesses 37 of the strap 35 into which the lever 33 is moved. When in its lowest position, the headrest 18 is supported by the extended ends 23 of the member 21 which rest on the side rails 12.

The creeper is supported on casters 38 and normally the rod 25, which has a certain amount of resiliency, sustains the headrest supporting member 21 above the floor. On the other hand, pressure of the head or shoulders against the headrest 18 will overcome the resistance of the rod 25 to force the bottom of the support 21 downwardly against the floor, as shown in Figure 3, thus to produce a braking effect on the creeper. However, the casters 38 remain in engagement with the floor, the frictional resistance between the support 21 and the floor preventing too free movement of the creeper while the mechanic is performing work requiring the creeper to remain stationary.

Manifestly, the construction as shown and described is capable of some modification and such modification as may be construed to fall within the scope and meaning of the appended claim is also considered to be within the spirit and intent of the invention.

What is claimed is:

In a mechanic's creeper, a platform mounted on casters and terminating rearwardly of the forward end of said creeper, a headrest disposed on a common plane with said platform and hinged along the rearward edge to the forward edge of said platform in the space between the terminal end of said platform and the forward end of said creeper and arranged for adjustment to a variety of angular positions in relation to said platform, a headrest supporting member having one of its ends rotatably connected to said headrest, stop members carried by said headrest adapted to engage the frame of said creeper between the forward edge thereof and the forward edge of said platform to preclude downward pivotal displacement of said headrest below the plane of said platform, a rod, a bracket supporting said rod from the underside of said platform for longitudinal reciprocation, means pivotally connecting the forward end of said rod to the other end of said headrest supporting member for changing the angular relationship of said headrest supporting member to said headrest to adjust the position of the latter, a lever traversing the underside of said platform and pivoted at one end to one side of said platform and having its opposite end extending from under the opposite side of said platform, a link pivotally connected at one end to the rear end of said rod, and at its opposite end to said lever opposite its pivot whereby movement of said lever will actuate said rod longitudinally, a strap secured at its ends to the underside of said platform and in adjacent parallelism with one side thereof and spaced from the latter to define an elongate space for said lever, said strap having transverse corrugations defining recesses selectively receiving said lever to hold the same in adjusted positions.

References Cited in the file of this patent

UNITED STATES PATENTS

| | | |
|---|---|---|
| 218,117 | Corwin | Aug. 5, 1879 |
| 513,419 | Rittberger | Jan. 23, 1894 |
| 635,578 | Nixon | Oct. 24, 1899 |
| 1,186,372 | Beeson | June 6, 1916 |
| 2,051,563 | Mance | Aug. 18, 1936 |
| 2,210,585 | Hulbert | Aug. 6, 1940 |
| 2,430,662 | Barton | Nov. 11, 1947 |
| 2,595,784 | Griffin et al. | May 6, 1952 |
| 2,703,717 | Miller | Mar. 8, 1955 |